(12) United States Patent
Eriksson et al.

(10) Patent No.: US 8,748,757 B2
(45) Date of Patent: Jun. 10, 2014

(54) TEMPERATURE COMPENSATED BUSHING DESIGN

(71) Applicants: Thomas Eriksson, Ludvika (SE); Peter Sjoberg, Ludvika (SE)

(72) Inventors: Thomas Eriksson, Ludvika (SE); Peter Sjoberg, Ludvika (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 13/952,388

(22) Filed: Jul. 26, 2013

(65) Prior Publication Data

US 2013/0306368 A1 Nov. 21, 2013

Related U.S. Application Data

(63) Continuation of application No. PCT/EP2011/073445, filed on Dec. 20, 2011.

(30) Foreign Application Priority Data

Jan. 28, 2011 (EP) ..................................... 11152449

(51) Int. Cl.
*H02G 3/22* (2006.01)
*H01B 17/00* (2006.01)
*H01B 17/26* (2006.01)

(52) U.S. Cl.
CPC ............... *H02G 3/22* (2013.01); *H01B 17/005* (2013.01); *H01B 17/26* (2013.01)
USPC .................. 174/650; 174/152 R; 174/137 R; 174/152 G; 174/142; 16/2.1; 16/2.2

(58) Field of Classification Search
CPC ............ B60R 16/0215; B60R 16/0207; B60R 16/0222; H02G 3/04; H02G 3/22; H02G 3/24; H02G 3/30; H02G 3/36; H02G 15/34; H02G 15/20; F16L 5/00; F16L 5/02; H01B 17/26; H01B 17/00; H01B 17/005
USPC ...... 174/650, 152 R, 152 G, 652, 153 G, 135, 174/142, 137 R, 151, 17 CT, 140 R; 439/587, 439/271, 272, 273, 274, 275; 16/2.1, 2.2; 248/56

See application file for complete search history.

(56) References Cited

U.S. PATENT DOCUMENTS 1,967,653 A 7/1934 Austin
7,262,367 B2 * 8/2007 Donzel et al. ............. 174/137 R
(Continued)

FOREIGN PATENT DOCUMENTS

EP 2117016 A1 11/2009

OTHER PUBLICATIONS

International Search Report & Written Opinion of the International Searching Authority Application No. PCT/EP2011/073445 Completed: Feb. 29, 2012; Mailing Date: Mar. 7, 2012 11 pages.

(Continued)

*Primary Examiner* — Angel R Estrada
(74) *Attorney, Agent, or Firm* — St. Onge Steward Johnston & Reens LLC

(57) ABSTRACT

A bushing including a bottom contact, and a tubular conductor, having a lower part having an end in electrical and mechanical contact with the bottom contact, and a draw rod arrangement, inside the conductor, arranged to exert sufficient contact pressure between the bottom contact and the conductor, and the draw rod arrangement includes a member in mechanical contact with the conductor and draw rod having a second end, fixedly connected to the bottom contact, and a first end in connection to the member and clamping means, the clamping means is adapted to apply a force, urging the member in the direction of the bottom contact to generate sufficient contact pressure between the bottom contact and the conductor. The member of the draw rod arrangement is arranged to apply the force to the lower part of the conductor.

12 Claims, 4 Drawing Sheets

(56) References Cited

U.S. PATENT DOCUMENTS

| | | | |
|---|---|---|---|
| 7,812,266 B2 * | 10/2010 | Rocks et al. | 174/137 R |
| 7,825,331 B2 * | 11/2010 | Allais et al. | 174/152 R |
| 7,964,799 B2 * | 6/2011 | Isberg et al. | 174/152 R |
| 8,003,891 B2 * | 8/2011 | Rocks et al. | 174/152 R |
| 8,150,230 B2 * | 4/2012 | Tilliette et al. | 174/152 R |
| 8,222,526 B2 * | 7/2012 | Bresney et al. | 174/152 R |
| 8,471,150 B2 * | 6/2013 | Emilsson et al. | 174/140 R |

OTHER PUBLICATIONS

ABB AB Components: "Resin Impregnated Paper Bushing, Oil to SF6, Type GSBK, Technical Guide"; Dec. 20, 2010, 13 pages.
ABB AB Components: "Resin Impregnated Paper Bushing, Oil to Air, Type GSB, Technical Guide"; Dec. 20, 2010; 17 pages.

* cited by examiner

TEMPERATURE COMPENSATED BUSHING DESIGN

FIELD OF THE INVENTION

The present invention relates to the field of high voltage power systems, and in particular to high voltage bushings used in high voltage devices, such as transformers or reactors, forming parts of such systems.

BACKGROUND OF THE INVENTION

It is known that high voltage equipment and devices, e.g. high voltage transformers, reactors, switchgear etc., are usually equipped with bushings that are adapted for carrying current at high potential through a grounded barrier, e.g. a wall or an enclosure of the electric device such as a transformer tank.

Conventional high voltage bushings comprise a hollow tube electrical conductor. The electrical conductor connects one side of the bushing, where a high voltage electric device is connected, with the other side of the bushing where another electric device is connected. For example, when the first electric device is a transformer, the bushing is fitted on the transformer enclosure and the conductor of the bushing connects the inside of the transformer with the outside, where another electric device can be connected, e.g. a bus, surge arrester or DC-valve. The bushing further comprises a hollow insulator around the conductor made of ceramic or composite material, which is normally provided with sheds.

Electrical devices are conventionally filled with oil acting as insulating and cooling medium inside the device tank, such as a transformer tank. This means that the bushing mostly needs to be assembled to the device after the oil has been provided, which required special assembly arrangements. One example thereof is a draw rod system, which also allows on-site installation without accessing the leads from inside the transformer main tank. The lower part of the bushing's connection system is left inside the transformer before sealing. During transformer field installation, the draw rod is pushed through the bushing and connected to the bushing's connection system inside the transformer. The bushing is put in place and the bushing's connection system is pulled from the outside by the draw rod to ensure necessary contact force and low through resistance between the transformer internal contact and the bushing bottom contact.

A schematic example of a prior art general bushing will now be described with reference to FIG. 1, showing a schematic cross sectional view of a bushing 11. A high voltage conductor 2 runs through the center of a hollow bushing insulator 12 that forms a housing around the high voltage conductor.

A flange 16 is provided on the outside of the housing 12, by means of which the housing of the bushing is connected to ground, via the transformer tank wall 18.

In FIG. 1 is also shown how the bottom end portion of the high voltage conductor 2 forms a bottom contact 3 that is arranged to be connected to the internal components of the transformer.

An upper outer terminal 24 for the conductor 2 is provided at the upper end of the bushing, opposite the bottom contact end. The outer terminal 24 is electrically connected to the conductor 2 through an interface, also forming a top cover of the bushing, in order to electrically connect the conductor and thus the transformer to an external source or device.

The term high voltage is conventionally used for voltages above approximately 50 kV. Today, the upper limit in commercial high voltage devices is generally 1100 kV, but higher voltages, such as 1200 kV or even more, are envisaged. Also, current levels are increasing and may be up to 4000-5000 A or even higher.

For high voltages in the region of 500 kV and more, and current ratings of 2000 A and above, the demands on the bushings are naturally increased, e.g. when it comes to heat dissipation and cooling, electric fields, electric insulation of the bushing etc. The higher the voltage, the longer the bushing has to be, and for these high voltages the length of the bushing exceeds 10 m. In this context, it becomes essential to have a low loss and efficient cooling of the bushing. The losses in today's bushings mainly occur due to losses in the conductor and in each contact or joint in the current path between different parts of the bushing. The losses in the conductor itself can be optimized by selecting the material, the shape and the size of the conductor. It is recognized that to have an effective bushing with low losses it is important to ensure that the contact pressure between the bottom contact and the conductor is sufficient to ensure a good contact. "Cold start" of a bushing at very low temperatures with full current can be very difficult and can lead to a loss of contact pressure.

The contact pressure between the bottom contact and the conductor is ensured by applying a force on the conductor via a draw rod arrangement. The prior art draw rod arrangement is schematically shown in FIGS. 2A and 2B where a draw rod 1 is fixed to the bottom contact 3 in one end and in the other end a member 4 in mechanical contact with the top part of the conductor 2. Clamping means 5 are adapted to apply a downward force on the member 4 onto the conductor 2 to ensure that contact pressure between the bottom contact 3 and the conductor 2 is sufficient. One example of the draw rod 1 and member 4 is disclosed in EP2117016.

The draw rod is normally made of steel or another suitable metal and the conductor is made out of copper or aluminium or alloys thereof. The difference in thermal expansion between the two materials will change the contact pressure between the bottom contact and the conductor when the bushing is getting warm from electrical losses during use. There is a risk that the contact pressure will be too low and thus increasing losses or that the contact pressure will be too high and deform parts of the bushing, draw rod or contacts. To overcome this, the different solutions with springs, that are arranged to maintain the contact pressure as the temperature in the bushing changes, have been implemented. Another solution is to modify the thermal expansion of the drawing rod by using special materials that have similar thermal expansion as the conductor to minimize the difference between the change in length between the draw rod and the conductor as the temperature changes.

The solution with springs to keep up the contact pressure as the temperature in the bushing changes makes the design more complex and increases the possibility that errors occur during assembly of the bushing. As the voltage increases and the bushings get longer, the difference in length that has to be compensated with the spring increases, this makes the solution with spring more undesirable. Using special materials that have similar thermal expansion as the conductor make the design more expensive.

SUMMARY OF THE INVENTION

It is an object of the present invention to provide a high voltage bushing that ensures that the contact pressure between the bottom contact and the conductor is nearly constant over the operational temperature range which improves prior art bushings.

It is also an object of the present invention to provide a high voltage device comprising such a high voltage bushing.

A bushing according to the invention comprises; a bottom contact, and a tubular conductor, having a lower part having an end in electrical and mechanical contact with the bottom contact, and a draw rod arrangement, inside the conductor, arranged to exert sufficient contact pressure between the bottom contact and the conductor, and the draw rod arrangement comprises a member in mechanical contact with the conductor and draw rod having a second end, fixedly connected to the bottom contact and a first end in connection to the member and clamping means adapted to apply a force, urging the member in the direction of the bottom contact to generate sufficient contact pressure between the bottom contact and the conductor, wherein the member is arranged to apply said force to the lower part of the conductor.

An advantage of this invention is that the contact pressure between the bottom contact and the conductor is by design nearly constant over the operational temperature range independent of what the thermal expansion coefficient is for the conductor tube and the draw rod which improves prior art bushings by ensuring constant low losses in the contact or joint in the current path between different bottom contact and conductor in the bushing. The constant low losses ensure that the heat generation does not suddenly increase and this limits the maximal cooling needs of the bushing. The solution is simple to realize and do not require any special materials. Furthermore, the present invention minimizes the possibility for errors during assembly of the bushing.

In the present invention, the contact pressure between bottom contact and conductor applied during the assembly of the bushing will be the same contact pressure during the whole operation. In prior art, the contact pressure applied during assembly needs to be calculated so that the contact pressure during operation is correct. The calculation is depending on factors such as the ambient temperature during assembly, the expected operating temperature range of the bushing, construction and material properties. The expected operating temperature of the bushing depends on different factors such as load and ambient temperature range.

According to an embodiment of the present invention, the member comprises; a top part, and a support tube arranged around and in parallel with the draw rod, having a first end being in contact with the top part and a second end fixedly connected to the lower part of the conductor, and the clamping means is adapted to apply the force on the top part.

According to another embodiment of the present invention, the second end of the support tube comprises a flange shaped part fixedly connected to the lower part of the conductor and the second end of the support tube being in contact with the flange shaped part.

According to another embodiment of the present invention, the second end of the support tube comprises an expansion of the outer diameter being equal to the inner diameter of the lower part of the conductor and the second end of the support tube being fixed directly onto lower part of the conductor.

According to another embodiment of the present invention, the flange shaped part is separate part from the support tube and conductor and is fixedly connected to the lower part of the conductor by welding or by threads.

According to another embodiment of the present invention, the flange shaped part is an integral part of the conductor.

According to another embodiment of the present invention, the second end of the support tube being fixed directly onto lower part of the conductor by welding or by threads.

According to another embodiment of the present invention, at least one electrical insulating support member is arranged between the support tube and an upper part of the conductor.

According to another embodiment of the present invention, the draw rod and the support tube are made from the same material and have the same thermal expansion in the longitudinal direction.

According to another embodiment of the present invention, the draw rod comprises two or more parts joined together by a joint.

According to another embodiment of the present invention, the support tube comprises two or more parts that support each other in the longitudinal direction.

According to another embodiment of the present invention, an electrically insulating structure is arranged around the conductor along at least part of the conductor's length.

Another embodiment of the present invention is a high voltage device comprising at least one bushing according to the present invention and said high voltage device being either a transformer or a reactor.

BRIEF DESCRIPTION OF THE DRAWINGS

The drawings constitute a part of this specification and include exemplary embodiments to the invention, which may be embodied in various forms.

The present invention will now be described with reference to the enclosed drawings, illustrating embodiments of the invention, by way of example only, and in which.

DETAILED DESCRIPTION OF THE INVENTION

Detailed descriptions of the preferred embodiment are provided herein. It is to be understood, however, that the present invention may be embodied in various forms.

In this description, the term "high voltage" (HV) will be used for voltages of 50 kV and higher. The present upper limit for commercial high voltage is 1100 kV, but it is foreseen that the invention can be used also for higher voltages, up to 1200 kV or even more. Generally, the present invention will find its applicability from about 200 kV and upwards.

Figure 1:
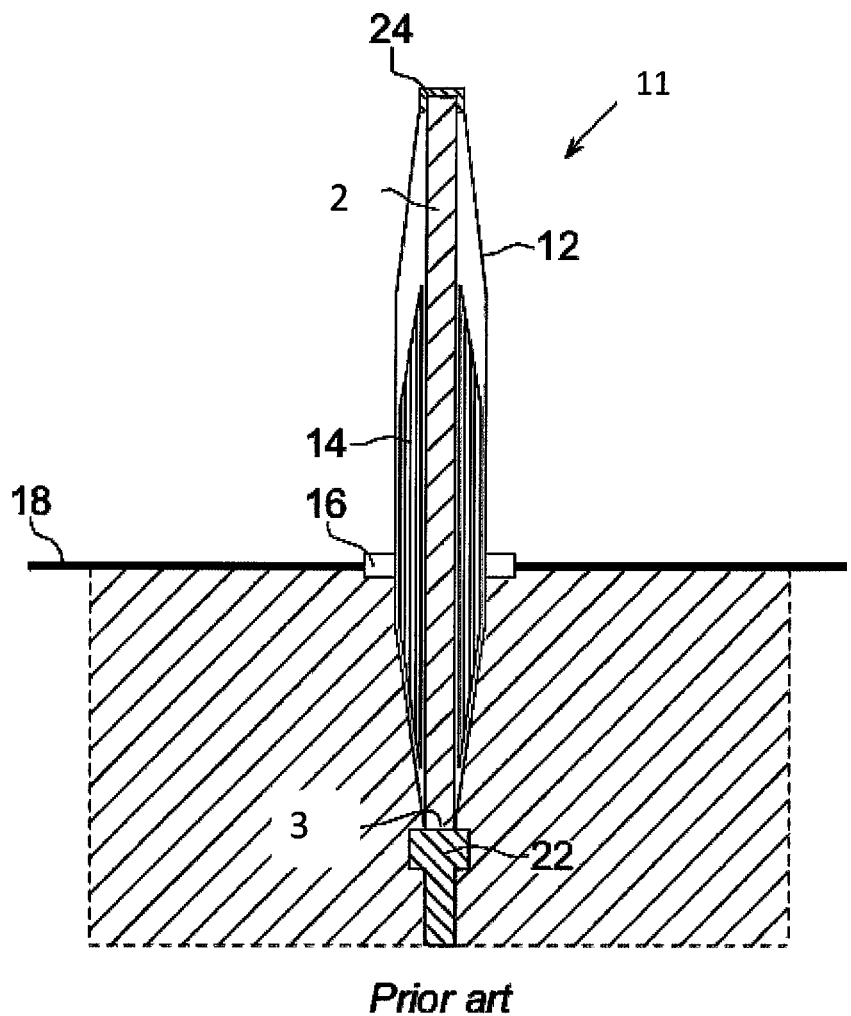
FIG. 1 illustrates schematically a high voltage bushing according to prior art.
Figure 2A:
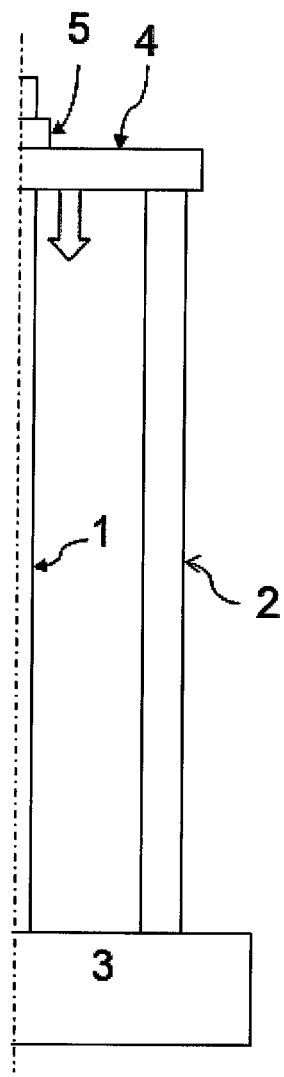
FIG. 2A, 2B illustrates schematically, the prior art solution with a draw rod arrangement fixed on the top of the conductor

In FIG. 2A, one end of the draw rod 1 is fixed in the bottom contact 3, and in the other end of the draw rod 1 is arranged with a member 4 with a through hole for the draw rod and the member is in contact with the conductor, above the conductor. A clamping means 5 is attached to the draw rod, this forces the member 4 down onto the conductor 2, which ensures that the contact pressure between the conductor 2 and the bottom contact 3 is sufficient.

Figure 2B:
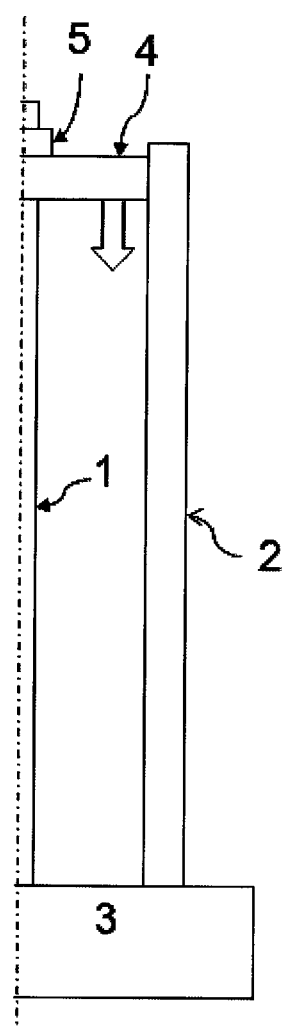

In the FIG. 2B the member 4 is fixed in the top end of the conductor 2. Both these solutions are known in the art.

The clamping means 5 has to be reachable from outside of the conductor, on the top, so that the clamping means 5 can be manipulated and the contact pressure can be tuned and determined when the bushing is assembled.

Figure 3:
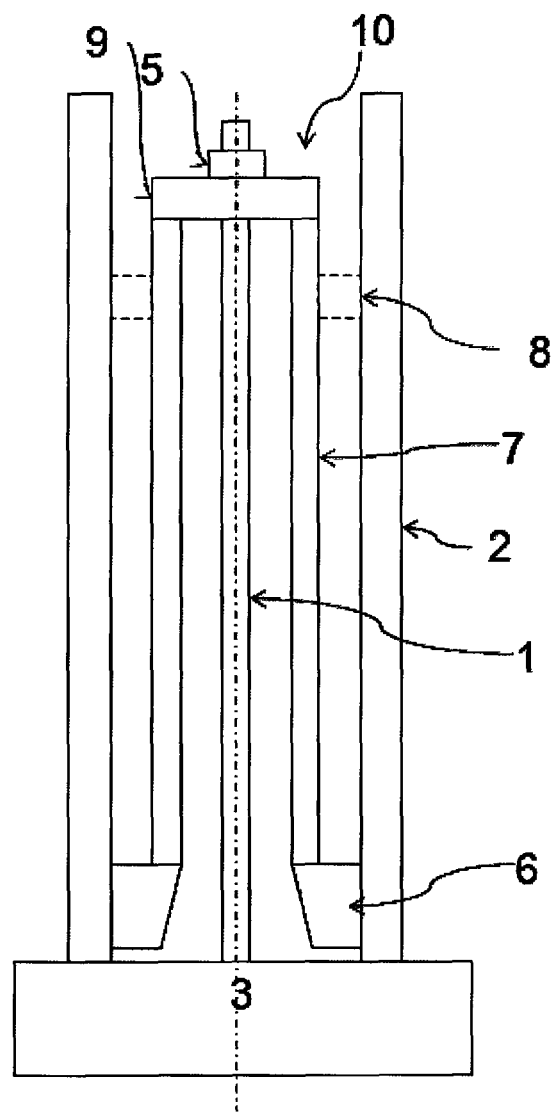
FIG. 3 illustrates schematically, the draw rod arrangement according to the present invention.

FIG. 3 shows one embodiment of the present invention where a second end of the draw rod 1 is fixed in the bottom contact 3 and a first end of the draw rod 1 is arranged with a member 10 arranged to apply a force to the lower part of the conductor 2. The member 10 comprises a top part 9 with a through hole for the first end of the draw rod and, a flange arrangement 6 fixated inside the hollow conductor close to the bottom contact and a support tube 7 arranged around and in parallel with the draw rod between the top part 9 and flange arrangement 6. A clamping means 5 is attached to the first end of the draw rod, above the top part 9. The clamping means 5 forces the top part down onto the support tube 7 and over the flange arrangement onto the conductor 2, and this ensures that the contact pressure between the conductor 2 and the bottom contact 3 is sufficient and constant over the operational temperature range. The total length of the conductor 2 and draw rod 1 can be 10-20 m or more in a high voltage bushing. Since the draw rod and the support tube 7 are made from the same material they have the same thermal expansion, thus the contact pressure between the conductor 2 and the bottom contact 3 is constant and independent of the operating temperature. The figures have a rotational symmetry around the axis through the draw rod 1. This axis is in the axial direction or the longitudinal direction and the orthogonal direction to this is the radial direction.

The top part 9 is arranged with a hole where the draw rod can be passed through, and a clamping means 5 is attached on the draw rod 1. The clamping means 5 adapted to apply a force on the top part should be arranged so that it can be manipulated from the side of the conductor 2 opposite to the bottom contact by a person assembling the bushing. The clamping means 5 could be one or several draw rod nuts applied to a threaded part of the first end of the draw rod outside of the top part and the manipulating can be tightened the bolt from the upper end of the conductor. The contact pressure can be controlled by measuring the turning moment of the bolt.

The clamping means 5 should also be arranged so it can be observed from the side of the conductor 2 opposite to the bottom contact. The contact pressure can be determined very accurately by observing the length increase above the clamping means 5 or top part 9 before and after the clamping means have applied the force. When the clamping means 5 apply pressure on the top part 9, the draw rod 1 will extend elastically and the support tube 7 will be compressed elastically. The relation between contact pressure and extension of the draw rod and the compression of the support tube can be very accurately calculated beforehand. The instruction for generating the correct contact pressure during assembly is then very simple "Part of draw rod visible should be increased with X mm" and this can be simply and accurately controlled afterwards by supervisors.

The flange arrangement 6 can be a separate part or an integral part of the conductor 2 or the flange arrangement 6 can be a separate part or an integral part of the support tube 7. The fixation of the flange part 6 onto the conductor, if it is separate from the conductor, can be arranged by threads, welding or soldering or gluing.

To support the conductor 2, e.g. to prevent gravitational deflection of the conductor if the bushing is horizontally or near horizontally arranged or damp conductor movements during earthquakes, one or more insulating radially supporting part 8 can be arranged between the conductor 2 and the supporting tube 7. The supporting part 8 only supports the conductor 2 radially, the conductor or support tube 1 can move axially relative to each other. The supporting part 8 is preferably in the form of a ring arranged between the conductor 1 and the supporting tube 7. If only one supporting part 8 is used, it is preferably arranged on the center or upper part of the conductor.

The draw rod 1 may comprise of several draw rod parts, each connected to each other before or during installation. The connection is preferably achieved by having turns on the ends of the draw rod parts and using a connector nut to attach the parts together possibly by using a suitable glue, e.g. Locktite, to secure the nut.

The support tube 7 is either in one piece of similar length to the conductor 2 or the support tube 7 can comprise of two or more parts where one part is supporting the other part in the longitudinal direction. The support tube parts can be stacked without securing the connection or the connections between the support tubes can be secured by means, e.g. glue, welding, connector nut.

Figure 4A:
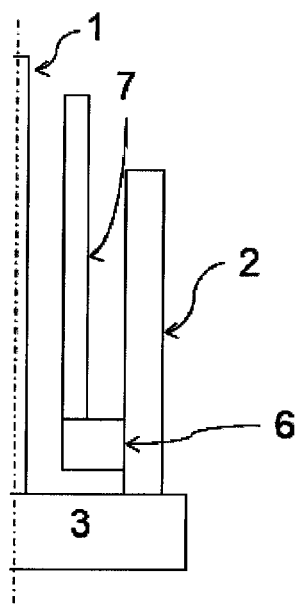
FIGS. 4A, 4B and 4C illustrates schematically, different embodiments of how the second end of the support tube can be fixedly connected to the lower part of the conductor.

FIG. 4A shows that the second end of the support tube 7 comprises a flange shaped part 6 fixedly connected to the lower part of the conductor 2 and the second end of the support tube 7 being in contact with the flange shaped part 6. The flange shaped part 6 is a separate part from the support tube 7.

Figure 4B:
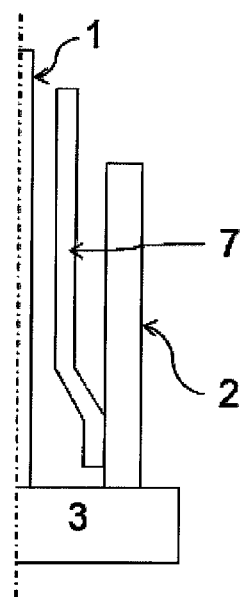

FIG. 4B shows the second end of the support tube 7 comprises an expansion of the outer diameter being equal to the inner diameter of the lower part of the conductor 2 and the second end of the support tube 7 being fixed directly onto lower part of the conductor 2 by welding or by threads.

Figure 4C:
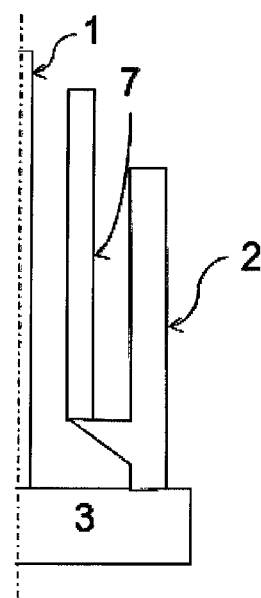

FIG. 4C shows an embodiment where the flange shaped part can be an integral part of the conductor 2 where a protrusion on the inner side of the lower part of the conductor 2 supports the support tube 7.

What is claimed is:

1. A bushing comprising
   a bottom contact, and
   a tubular conductor, having a lower part having an end in electrical and mechanical contact with the bottom contact, and
   a draw rod arrangement, inside the conductor, arranged to exert sufficient contact pressure between the bottom contact and the conductor, and
   the draw rod arrangement comprises a member in mechanical contact with the conductor and draw rod having a second end, fixedly connected to the bottom contact, and a first end in connection to the member and clamping means, the clamping means is adapted to apply a force, urging the member in the direction of the bottom contact to generate sufficient contact pressure between the bottom contact and the conductor,
characterized in that
   the member comprises;
   a top part, and
   a support tube arranged around and in parallel with the draw rod, having a first end being in contact with the top part and a second end fixedly connected to the lower part of the conductor, and the clamping means is adapted to apply the force on the top part and said member is arranged to apply said force to the lower part of the conductor.

2. The bushing according to claim 1 wherein the second end of the support tube comprises a flange shaped part fixedly connected to the lower part of the conductor and the second end of the support tube being in contact with the flange shaped part.

3. The bushing according to claim 1 wherein the second end of the support tube comprises an expansion of the outer diameter being equal to the inner diameter of the lower part of the conductor and the second end of the support tube being fixed directly onto lower part of the conductor.

4. The bushing according to claim 2 wherein the flange shaped part is separate part from the support tube and conductor and is fixedly connected to the lower part of the conductor by welding or by threads.

5. The bushing according to claim 2 wherein the flange shaped part is an integral part of the conductor.

6. The bushing according to claim 3 wherein the second end of the support tube being fixed directly onto lower part of the conductor by welding or by threads.

7. The bushing according to claim 1 wherein the bushing comprises at least one electrically insulating support member arranged between the support tube and an upper part of the conductor.

8. The bushing according to claim 1 wherein the draw rod and the support tube are made from the same material and have the same thermal expansion in the longitudinal direction.

9. The bushing according to claim 1 wherein the draw rod comprises two or more parts joined together by a joint.

10. The bushing according to claim 1 wherein the support tube comprises two or more parts that support each other in the longitudinal direction.

11. The bushing according to claim 1 wherein an electrically insulating structure is arranged around the conductor along at least part of the conductors length.

12. A high voltage device comprising at least one bushing in accordance with claim 1, and said high voltage device being either a transformer or a reactor.

* * * * *